United States Patent
Ota et al.

(10) Patent No.: US 6,977,582 B2
(45) Date of Patent: Dec. 20, 2005

(54) SEATBELT FASTENING PROMPTING APPARATUS

(75) Inventors: Katsuhisa Ota, Isehara (JP); Dai Matsumoto, Hadano (JP)

(73) Assignee: Nissan Motor Co., Ltd., Yokohama (JP)

(*) Notice: Subject to any disclaimer, the term of this patent is extended or adjusted under 35 U.S.C. 154(b) by 195 days.

(21) Appl. No.: 10/737,923

(22) Filed: Dec. 18, 2003

(65) Prior Publication Data

US 2004/0124974 A1 Jul. 1, 2004

(30) Foreign Application Priority Data

Dec. 19, 2002 (JP) .............................. 2002-368748

(51) Int. Cl.[7] .............................................. B60Q 1/00
(52) U.S. Cl. .............................. 340/457.1; 340/425.5; 340/438; 340/457
(58) Field of Search .................... 340/457.1, 425.5, 340/438, 457, 459, 460, 461, 462; 180/281, 180/286; 701/45; 307/10.1

(56) References Cited

U.S. PATENT DOCUMENTS

| | | | | |
|---|---|---|---|---|
| 5,760,684 A | * | 6/1998 | Orbach | 340/457.1 |
| 6,215,395 B1 | * | 4/2001 | Slaughter et al. | 340/457.1 |
| 6,339,371 B1 | * | 1/2002 | Baggelaar et al. | 340/457.1 |
| 6,441,729 B1 | * | 8/2002 | Tu | 340/457.1 |
| 6,501,374 B1 | * | 12/2002 | King et al. | 340/457.1 |
| 6,860,355 B2 | * | 3/2005 | Houten et al. | 180/269 |

FOREIGN PATENT DOCUMENTS

JP 2002-211357 A 7/2002

* cited by examiner

*Primary Examiner*—Daryl C Pope
(74) *Attorney, Agent, or Firm*—Foley & Lardner LLP (57) ABSTRACT

A seatbelt fastening prompting apparatus comprises a display device of driving assistance information which displays driving assistance information on a screen, a seatbelt fastening detection device which detects a fastening situation of a seatbelt as to whether the seatbelt is fastened or unfastened, a vehicle speed detection device which detects a vehicle speed, and a control device which allows the screen to display warning contents to the effect that the seatbelt should be fastened, when an ignition switch is turned on and the seatbelt is detected as being unfastened by the seatbelt fastening detection device. In the seatbelt fastening prompting apparatus, the warning contents are changed to raise a warning level thereof step by step in accordance with the vehicle speed.

5 Claims, 6 Drawing Sheets

SEATBELT FASTENING PROMPTING APPARATUS

BACKGROUND OF THE INVENTION

1. Field of the Invention

The present invention relates to a seatbelt fastening prompting apparatus.

2. Description of the Related Art

Heretofore, it has been common to warn a driver by means of a warning lamp disposed on an instrument panel when the driver is driving in a state where a seatbelt is unfastened. However, because this warning lamp may be difficult to see, there has been a possibility that attention paid to fastening seatbelts is lowered, therefore leading to a deterioration of a seatbelt fastening rate.

Accordingly, there has been a technology adapted to prompt a passenger to fasten a seatbelt by means of a voice and an image when a vehicle is being driven in a state where the seatbelt is unfastened (refer to Japanese Patent Application Laid-Open No. 2002-211357).

SUMMARY OF THE INVENTION

However, the above-described conventional apparatus for confirming whether a seatbelt is fastened or unfastened has provided notification by the voice and the image when a seatbelt is unfastened. Hence, because the contents of the notification are changeless and uniform, the notification has not given the passenger acute awareness that seatbelts should be fastened, and thus could easily be ignored.

It is an object of the present invention to provide a seatbelt fastening prompting apparatus, in which warning contents to the effect that seatbelts should be fastened are changed step by step, the contents being displayed on a screen, thus making it possible to enhance a degree of awareness that seatbelts should be fastened and to improve a fastening seatbelt rate.

The first aspect of the present invention provides a seatbelt fastening prompting apparatus, comprising: a display device of driving assistance information which displays the driving assistance information on a screen; a seatbelt fastening detection device which detects a fastening situation of a seatbelt as to whether the seatbelt is fastened or unfastened; a vehicle speed detection device which detects a vehicle speed; and a control device which allows the screen to display warning contents to the effect that the seatbelt should be fastened, when an ignition switch is turned on and the seatbelt is detected as being unfastened by the seatbelt fastening detection device, wherein the warning contents are changed to raise a warning level thereof step by step in accordance with the vehicle speed.

The second aspect of the present invention provides a seatbelt fastening prompting apparatus, comprising: display means of driving assistance information for displaying driving assistance information on a screen; seatbelt fastening detection means for detecting a fastening situation of a seatbelt as to whether the seatbelt is fastened or unfastened; vehicle speed detection means for detecting a vehicle speed; and control means for allowing the screen to display warning contents to the effect that the seatbelt should be fastened when an ignition switch is turned on and the seatbelt is detected as being unfastened by the seatbelt fastening detection means, wherein the warning contents are changed to raise a warning level thereof step by step in accordance with the vehicle speed.

BRIEF DESCRIPTION OF THE DRAWINGS

The invention will now be described with reference to the accompanying drawings wherein.

DETAILED DESCRIPTION OF THE PREFERRED EMBODIMENT

Hereinafter, description will be made of embodiments of the present invention with reference to the drawings.

Figure 1:
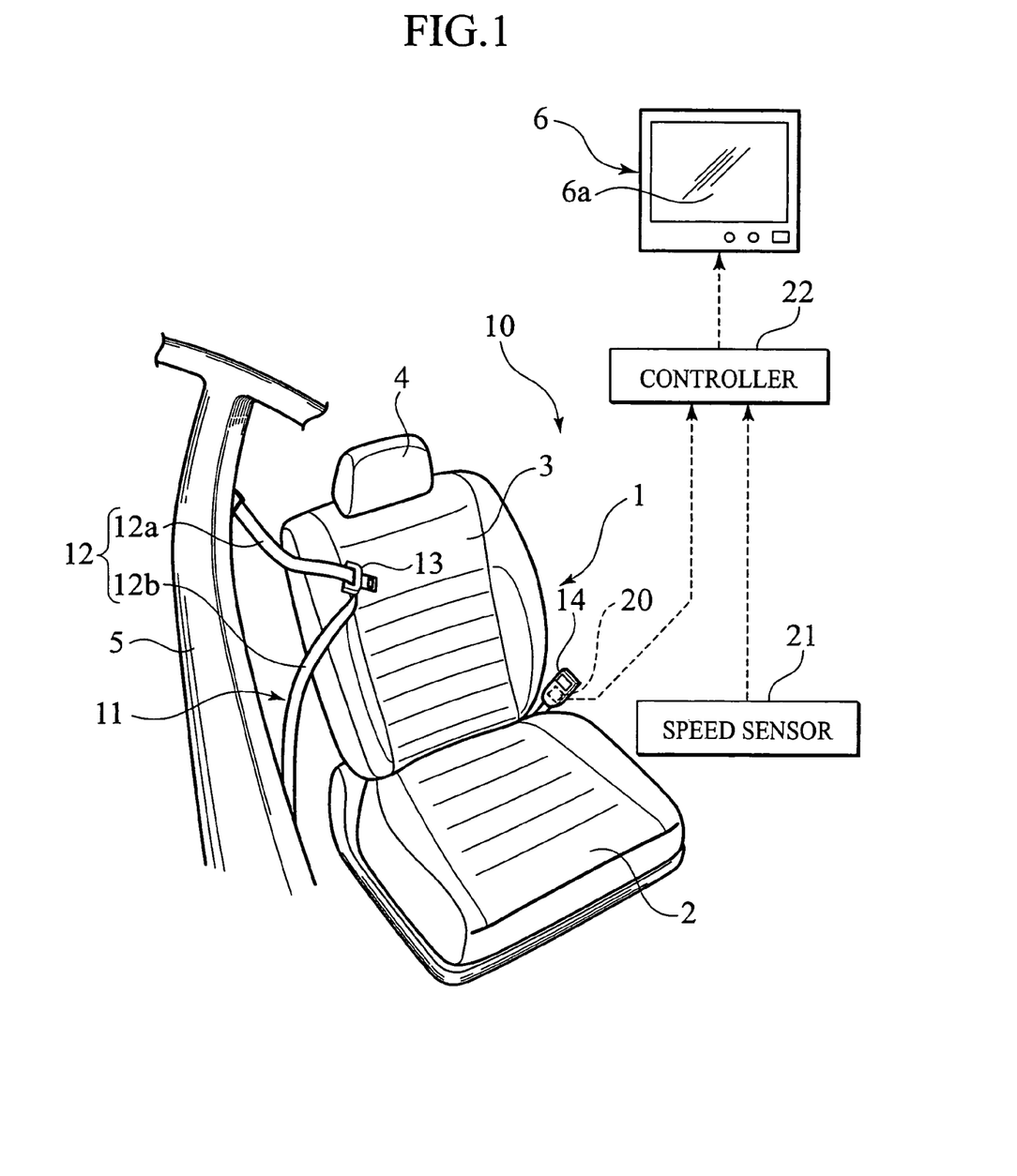
FIG. 1 is a perspective view showing a vehicle seat and a seatbelt according to an embodiment of the present invention.

As shown in FIG. 1, a seatbelt fastening prompting apparatus 10 of this embodiment is applied to a seatbelt 11 provided in a vehicle seat 1.

The vehicle seat 1 includes a seat cushion 2 for supporting the weight of a passenger (not shown), and a seat back 3 for supporting the back of the passenger. Moreover, the vehicle seat 1 is constituted with a headrest 4 being attached onto the center portion of the upper end of this seat back 3.

The seatbelt 11 includes a webbing 12 for restricting a passenger, a tongue 13 attached to a predetermined position of the webbing 12, and a buckle 14 for detachably attaching the tongue 13 thereto.

One end portion (upper end portion in the drawing) of the webbing 12 is inserted into the upper end portion of the pillar 5 located in the vicinity of one side (the left side in the drawing) of the seat back 3. The upper end portion of the webbing 12 is movably supported by this inserted portion. The tip portion of the webbing 12, which has been inserted into the inside of the pillar 5, is wound up around a retractor (not shown) accommodated in the pillar 5.

Hence, in a natural state, the webbing 12 is wound up around the retractor, and the upper end portion thereof is accommodated in the pillar 5. At the time of use, the webbing 12 is pulled, and thus is let out from the retractor and the pillar 5. Then, the tongue 13 is attached to the buckle 14 provided on the lower portion of the other side (the right side in the drawing) of the seat back 3. Thus, the upper portion 12a of the webbing 12 upward of the tongue 13 will restrict the passenger from the shoulder slantwise downward. The lower portion 12b below the tongue 13 will restrict the waist of the passenger.

A vehicle to which the seatbelt fastening prompting apparatus 10 is applied includes the navigation system 6 as a display device of driving assistance information as shown in FIG. 1. This navigation system 6 indicates a current position as the driving assistance information, which is obtained by a Global Positioning System (GPS) (not illustrated), on a map displayed on the screen 6a.

Here, a buckle switch 20, a vehicle speed sensor 21 and a controller 22 are provided in the seatbelt fastening prompting apparatus 10 of this embodiment as shown in FIG. 1. The buckle switch 20 is a seatbelt fastening detection device for detecting a fastening situation of the seatbelt 11 as to whether the seatbelt 11 is fastened or unfastened. The vehicle speed sensor 21 is a vehicle speed detection device for detecting a vehicle speed. The controller 22 is a control device for allowing the screen 6a of the navigation system 6 to display the warning contents that the seatbelt should be fastened when the seatbelt 11 is unfastened in a state where an ignition switch 7 (referring to FIG. 2) is turned on. The seatbelt fastening prompting apparatus 10 of this embodiment changes the warning contents to the effect that the seatbelt should be fastened so as to raise a warning level thereof step by step in accordance with the increase in vehicle speed.

Figure 4A:
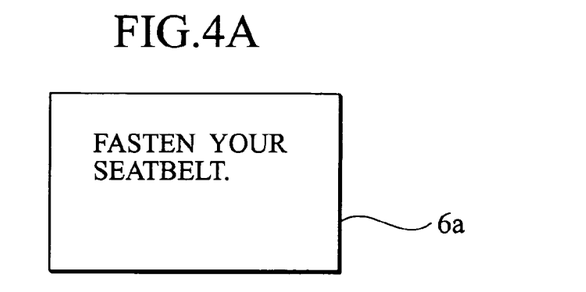
FIGS. 4A, 4B, 4C, and 4D are elevational views showing images of warning contents displayed by the seatbelt fastening prompting apparatus according to an embodiment of the present invention.
Figure 4B:
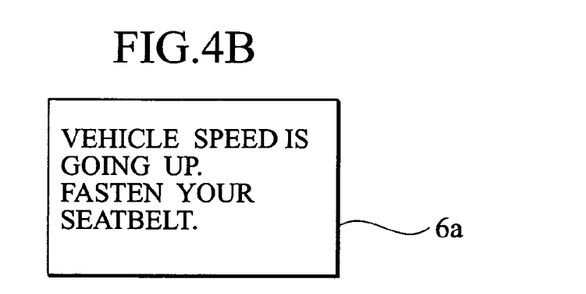
Figure 4C:
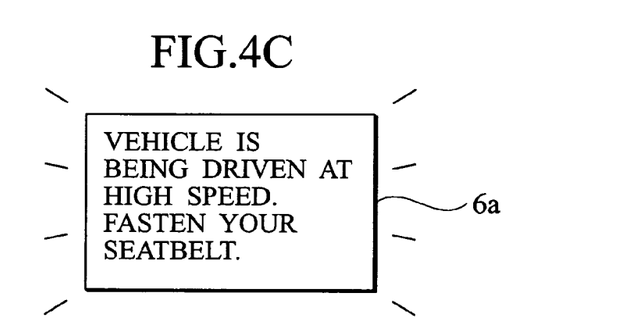
Figure 4D:
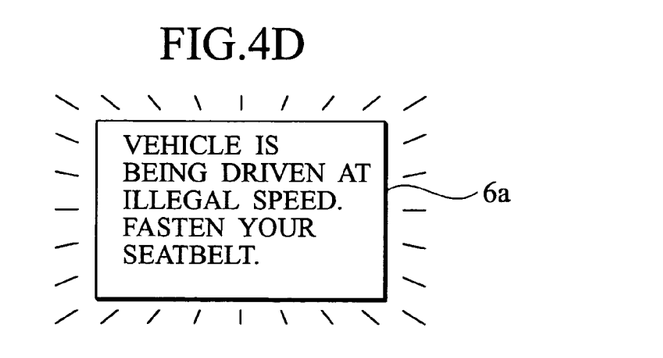

The warning contents are constituted as will be described below. First, four levels of warning sentences are provided in accordance with the vehicle speed V as detected by the vehicle speed sensor 21 as shown in FIGS. 4A to 4D. Here, the sentences of the respective views are classified for the following cases of vehicle speeds: FIG. 4A for the case of 0 km/h<V≦40 km/h; FIG. 4B for the case of 40 km/h<V≦60 km/h; FIG. 4C for the case of 60 km/h<V≦100 km/h; and FIG. 4D for the case of 100 km/h<V. The higher the vehicle speed V becomes, as shown in FIG. 4A to FIG. 4D, the higher the warning level of the warning contents becomes.

Moreover, warning is also performed by changing the background color and the interval of flashing of the screen 6a in accordance with the vehicle speed V. The screen of FIG. 4A has a yellow background which does not flash. The screen of FIG. 4B has an orange background which does not flash. The screen of FIG. 4C has a red background which flashes at long intervals. The screen of FIG. 4D has similarly a red background, which flashes at short intervals.

Figure 5A:
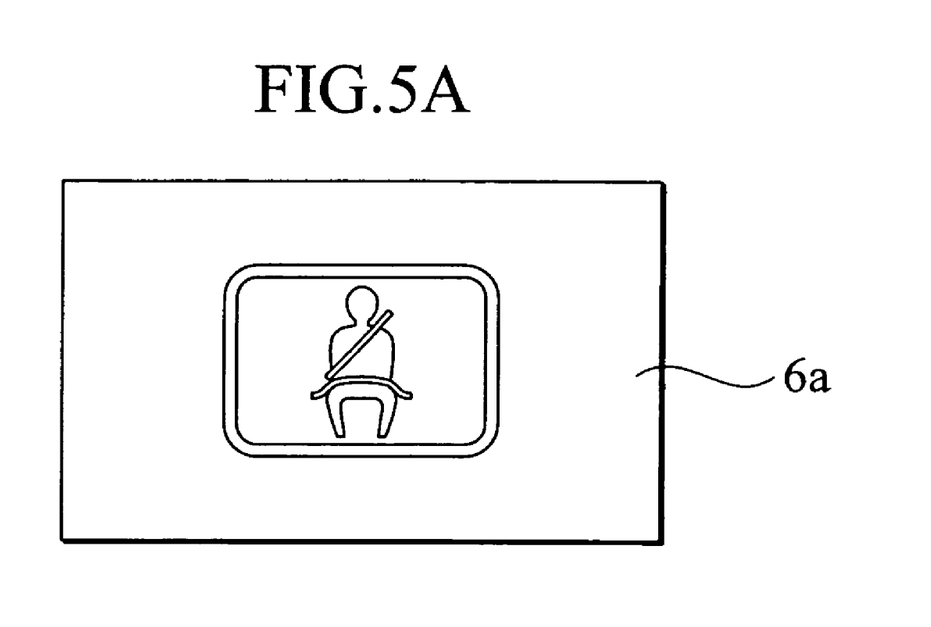
FIGS. 5A and 5B are elevational views showing background images of warning contents displayed by the seatbelt fastening prompting apparatus according to an embodiment of the present invention.
Figure 5B:
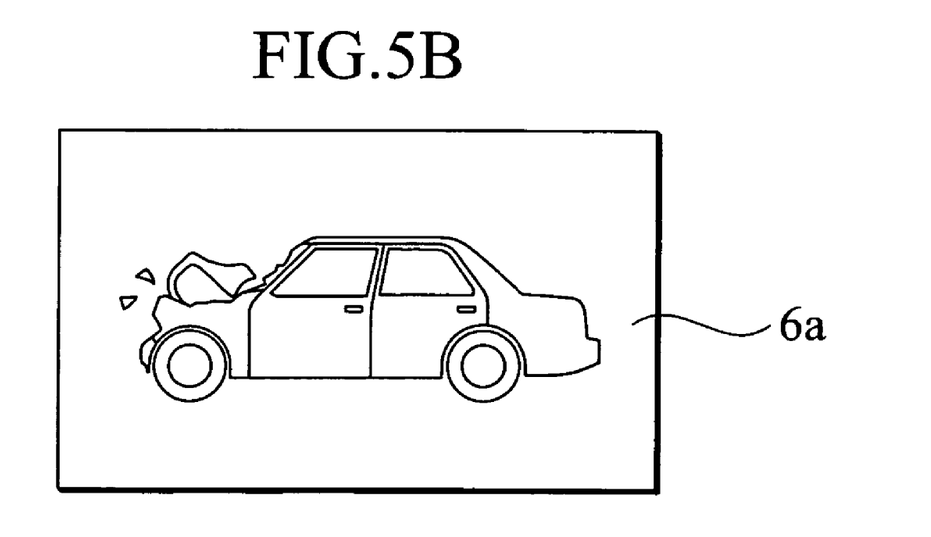

Furthermore, the background of the screen 6a can display patterns together with the colors changing, as shown in FIGS. 5A and 5B. FIG. 5A shows a pattern illustrating a fastened seatbelt 11 on the background of FIG. 4A so as to correspond to a low warning level. FIG. 5B shows a pattern illustrating a crashed vehicle on the background of FIG. 4B so as to raise the warning level. Moreover, the backgrounds of FIGS. 4C and 4D remain an impressive red color without any pattern.

Then, the warning contents illustrated in FIGS. 4A to 4D, 5A and 5B are displayed on the screen 6a continuously for a predetermined time (three to five minutes) after starting the vehicle. Then, the warning contents are displayed on the screen 6a intermittently while original navigation information is being displayed thereon after the elapse of the predetermined time. Specifically, the warning contents are displayed just for two to three seconds after the navigation information is displayed for two to three minutes after the elapse of the predetermined time.

Figure 2:
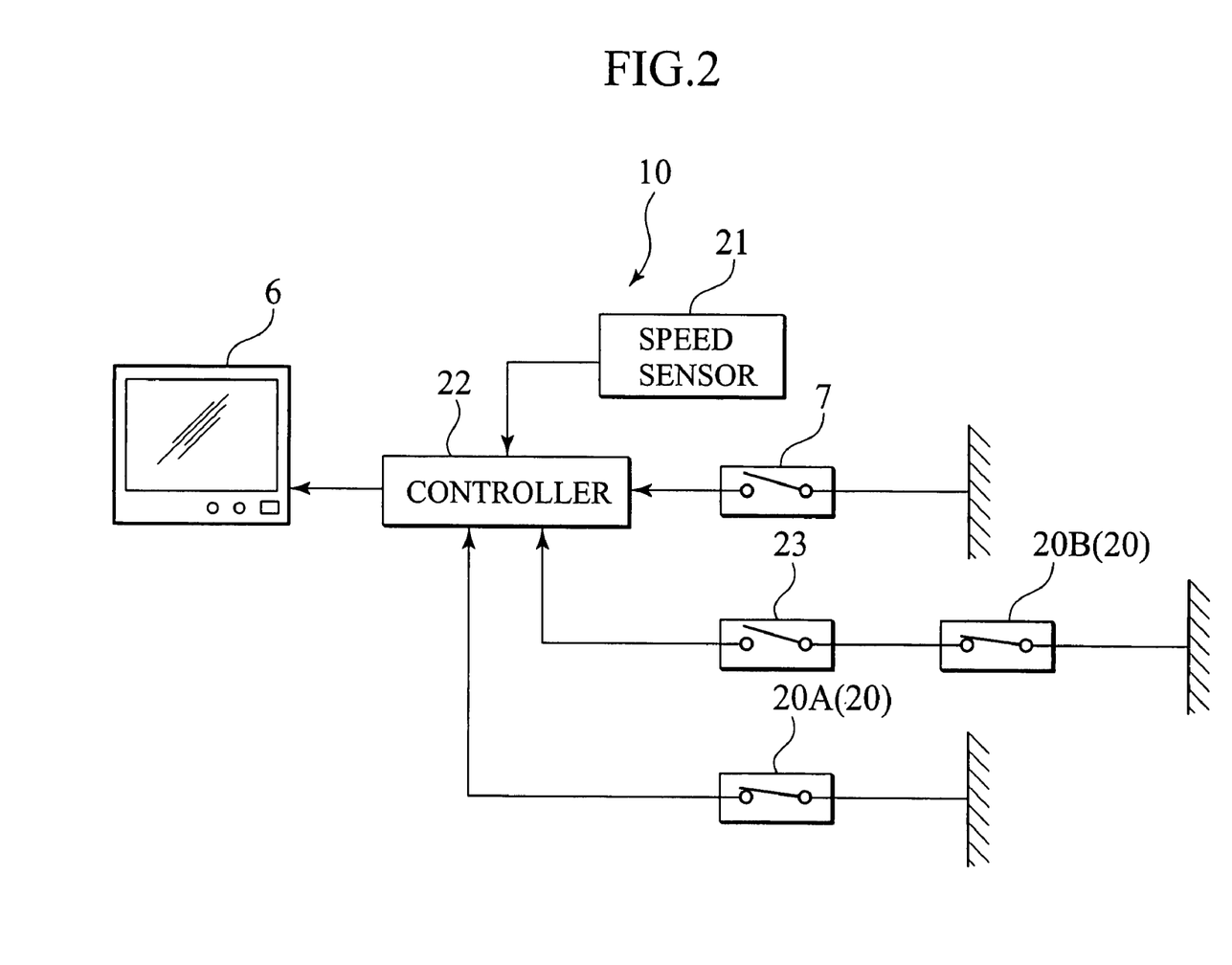
FIG. 2 is a system circuit diagram of a seatbelt fastening prompting apparatus according to an embodiment of the present invention.

Moreover, the seatbelt fastening prompting apparatus 10 is constituted in consideration of a constitution where two seatbelts 11 are installed: one being installed in a driver's seat; and another one being installed in a passenger's seat (another seat on which a passenger is seated). As shown in FIG. 2, the driver's seat side buckle switch 20A and the passenger's seat side buckle switch 20B are arranged in parallel. Furthermore, the seating sensor 23 for detecting that a passenger is seated in the passenger's seat is connected in series to the passenger's seat side buckle switch 20B.

The seating sensor 23 is constituted as a normally open type switch. The seating sensor 23 is switched on when the passenger is seated in the passenger's seat, thus making it possible to output the signal of the passenger's seat side buckle switch 20B to the controller 22.

Hence, as shown in FIG. 2, the ON or OFF signals of the ignition switch 7, driver's seat side buckle switch 20A, passenger's seat side buckle switch 20B and a signal of the vehicle speed V of the vehicle speed sensor 21 are inputted to the controller 22 individually. Then, the controller 22 outputs operation signals to the navigation system 6 based on these inputted signals and allows the screen 6a thereof to display the warning contents thereon.

The controller 22 allows the screen 6a of the navigation system 6 to display the warning contents thereon when the seatbelt of at least one of the driver's seat and the passenger's seat, in the case where the passenger is seated in the passenger's seat, is unfastened.

Figure 3:
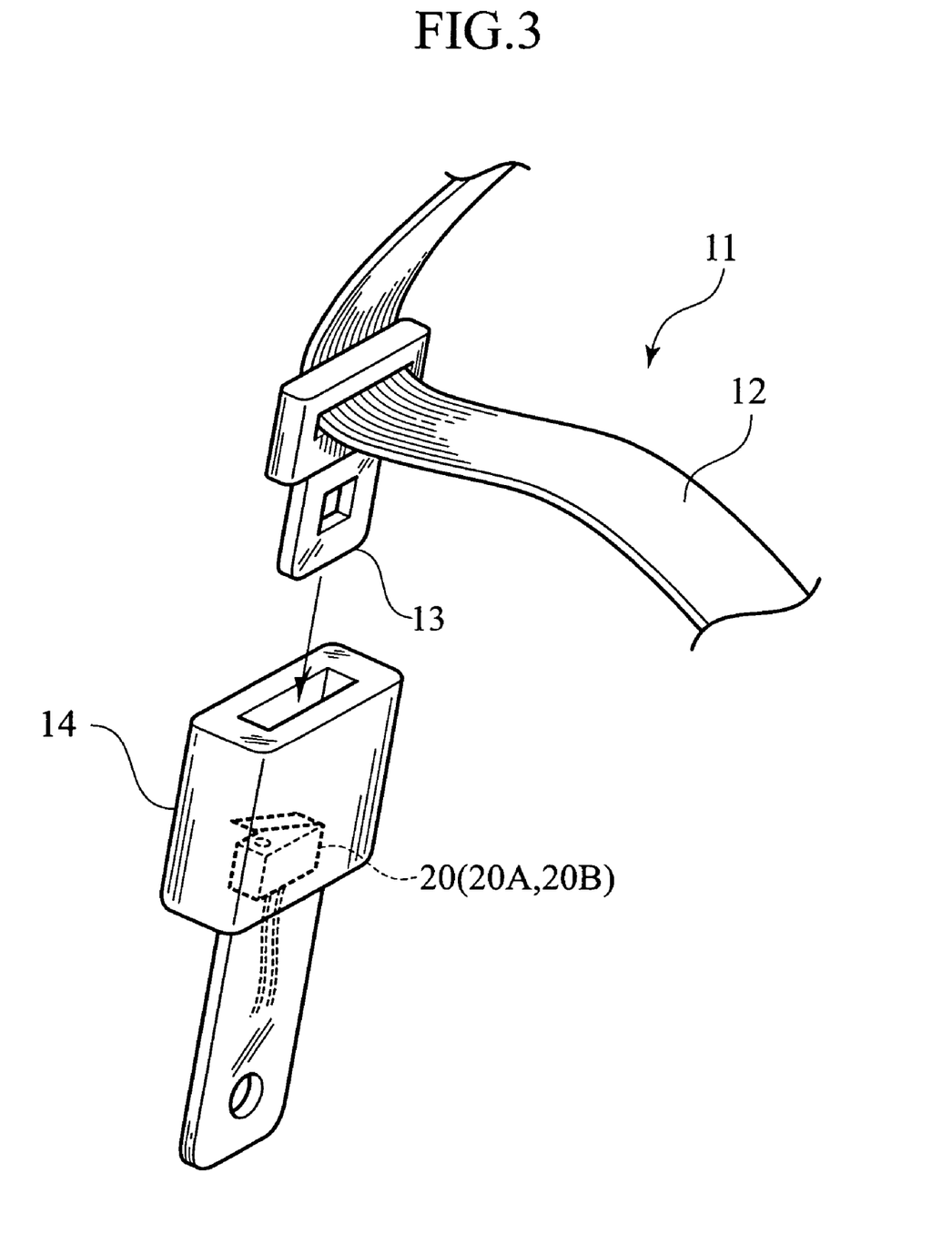
FIG. 3 is a perspective view showing a tongue and a buckle of a seatbelt having the seatbelt fastening prompting apparatus according to an embodiment of the present invention.

The buckle switches 20A and 20B are constituted as normally closed type switches. Each of the buckle switches 20A and 20B is switched on in the unfastened state of the seatbelt 11, where the tongue 13 of the seatbelt 11 is released from the buckle 14 as shown in FIG. 3. Meanwhile, each of the buckle switches 20A and 20B is switched off in the fastened state of the seatbelt 11, where the tongue 13 is inserted into and hooked onto the buckle 14.

Figure 6:
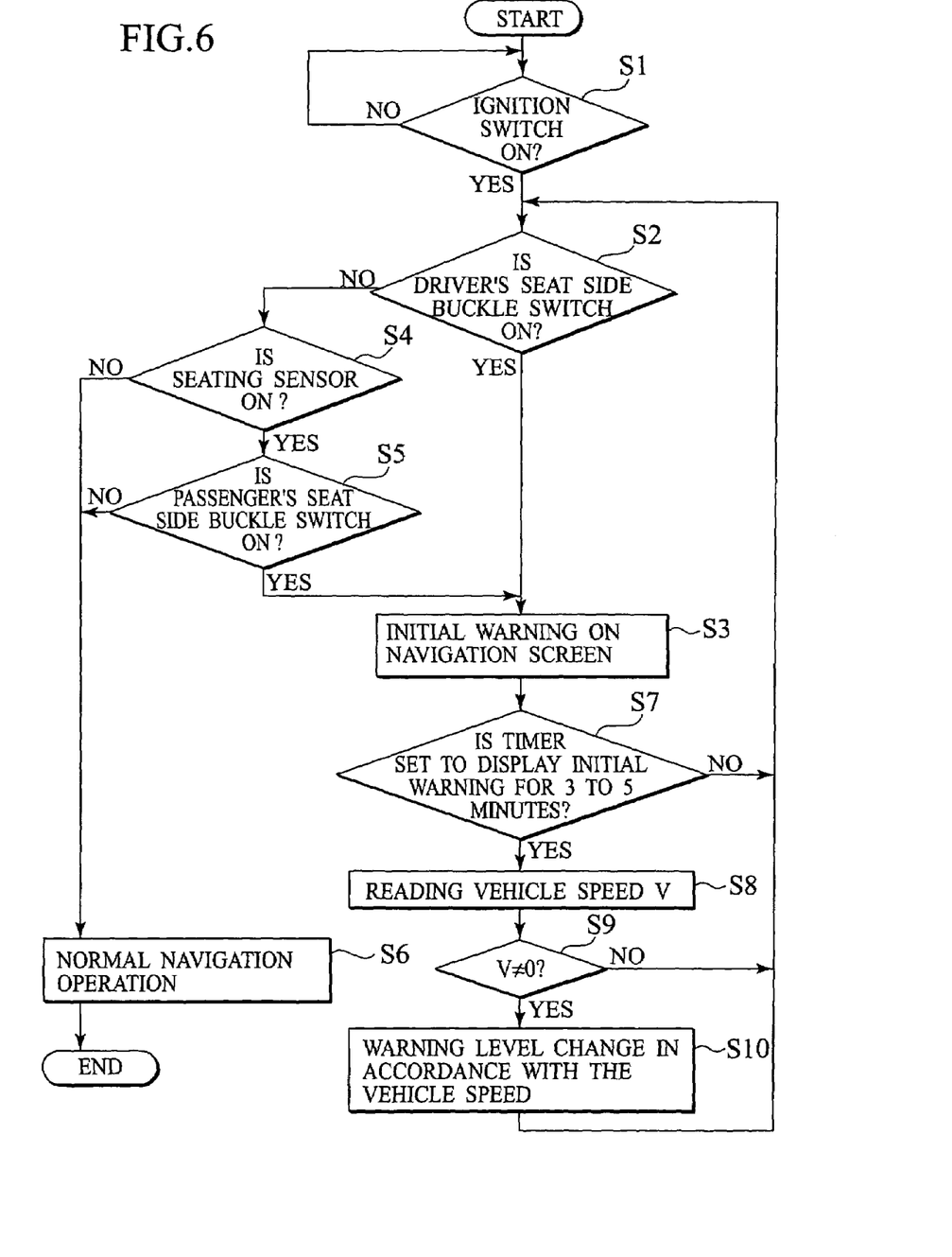
FIG. 6 is a flowchart of a control of the seatbelt fastening prompting apparatus according to an embodiment of the present invention.

The controller 22 performs the control in accordance with the flowchart of FIG. 6, and this flowchart is configured to be executed repeatedly at very short fixed intervals.

First, in the flowchart, when the ignition switch 7 has been determined to be switched on to start the engine at Step S1, whether or not the seatbelt 11 is unfastened is determined based on the signal of the driver's seat side buckle switch 20A at Step S2. When the driver's seat side buckle switch 20A is determined to be in an ON state (the seatbelt is unfastened), an initial image for warning is displayed on the screen 6a of the navigation system 6 at Step S3.

The initial image in this case displays, for example, the warning sentence illustrated in FIG. 4A or the pattern illustrated in FIG. 5A with the background being colored blue.

On the other hand, in case that the driver's seat side buckle switch 20A is switched off and that the driver fastens the seatbelt 11 is determined at Step S2, whether or not the seating sensor 23 of the passenger's seat is ON is determined at Step S4. The case where the seating sensor 23 of the passenger's seat is ON is the case where the passenger is seated in the passenger's seat. Therefore, whether or not the passenger's seat side buckle switch 20B is ON is determined at Step S5. When the passenger's seat side buckle switch 20B is ON (the seatbelt is unfastened), the initial image for warning is displayed on the screen 6a at Step S3.

Specifically, an initial warning (the initial image for warning) is displayed on the screen 6a by the controls performed in Steps S2 to S5 when any one of the seatbelts 11 of the driver's seat and the passenger's seat is unfastened.

Moreover, when the seating sensor 23 is determined to be OFF (the passenger's seat is vacant) at step S4, and the passenger's seat side buckle switch 20B is determined to be OFF (the seatbelt is fastened) at Step S5, the navigation system is normally operated at Step S6 to display the original navigation information on the screen 6a.

Next, a timer is operated at Step S7 after making the initial warning at Step S3. When the passenger does not fasten the seatbelt 11, the initial warning is displayed continuously for a fixed time (three to five minutes), and after the fixed time has elapsed, the vehicle speed V detected in the vehicle speed sensor 21 is read at Step S8.

Then, when V≠0 is established at the next Step S9, that is, the vehicle is being driven, the warning contents (referring to FIGS. 4 and 5) is displayed at Step S10 in accordance with the vehicle speed V read at Step S8.

With the above-described constitution, in the seatbelt fastening prompting apparatus 10 of this embodiment, when the ignition switch 7 is turned on in the state where the driver seated in the driver's seat and the passenger seated in the passenger's seat do not fasten their seatbelts, the controller 22 allows the screen 6a of the navigation system 6 to display thereon the warning contents to the effect that the seatbelts should be fastened. In this case, the warning contents have been changed so that the warning level thereof can be raised step by step in accordance with the vehicle speed V. Therefore, the passengers become acutely aware that the seatbelts 11 should be fastened and cannot help but fasten the seatbelts 11, thus leading to the enhancement of the seatbelt fastening rate.

In this case, when the driver fastens the seatbelt 11 and the passenger on the passenger's seat does not fasten the seatbelt 11, there will exist a time period while the function of the navigation system 6 referred to by the driver cannot be utilized. Therefore, the driver prompts the passenger to fasten the seatbelt 11, whereby the original function of the navigation system 6 can be recovered.

As a matter of course, when the passenger's seat is vacant, it will be determined whether or not the warning contents are to be displayed based only on the fastening situation of the seatbelt 11 by the driver.

Moreover, in the seatbelt fastening prompting apparatus 10 of this embodiment, in the case of an emergency escape, where the vehicle has to be started with no time to fasten the seatbelt 11, the warning contents are displayed, but do not affect the driving function itself. Therefore, the seatbelt fastening prompting apparatus 10 can cope with the need for emergency escape.

Incidentally, in this embodiment, in addition to the above-described operation and effect, a constitution has been adopted, in which the warning contents when the seatbelt is not fastened are displayed on the screen 6a continuously for the predetermined time (three to five minutes) after the start of the vehicle, and after the predetermined time has elapsed, the warning contents continue to be displayed on the screen 6a intermittently (for two to three seconds) until the seatbelt is fastened while the original navigation information is being displayed (for two to three minutes) thereon. Thus, the navigation information and the warning contents are displayed repeatedly. Accordingly, the warning contents being displayed intermittently are nuisance, though it is still made possible to utilize the original navigation information. Therefore, the awareness that the seatbelt 11 should be fastened can be enhanced, and the seatbelt fastening rate can be enhanced.

Moreover, in this embodiment, the warning contents have been displayed when any one of the driver and the passenger in the passenger's seat do not fasten the seatbelt in consideration of the respective seatbelts 11 being installed to the driver's seat and the passenger's seat. Therefore, the fastening of the seatbelt 11 by the passenger on the passenger's seat can be prompted effectively.

Furthermore, a constitution has been adopted, in which the navigation system 6 is used as the display device of driving assistance information, and the warning contents are displayed on the screen 6a thereof. Thus, a degree of awareness when the warning contents are displayed on the screen 6a can be enhanced to a great extent because the screen 6a of the navigation system 6 is usually designed so as to be enlarged for easy visual recognition. Hence, the present invention leads to the improvement of the seatbelt fastening rate, and the cost of the seatbelt fastening prompting apparatus 10 can be reduced because the warning can be made by utilizing existing apparatus.

Incidentally, though the seatbelt fastening prompting apparatus of the present invention has been described by exemplifying the above-described embodiment, the present invention may be applied only to the seatbelt 11 on the driver's seat, or the present invention can also be applied to seatbelts on a rear seat as well as the passenger's seat.

The entire content of a Japanese Patent Application No. P2002-368748 with a filing date of Dec. 19, 2002 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A seatbelt fastening prompting apparatus, comprising:
   a display device of driving assistance information which displays the driving assistance information on a screen;
   a seatbelt fastening detection device which detects a fastening situation of a seatbelt as to whether the seatbelt is fastened or unfastened;
   a vehicle speed detection device which detects a vehicle speed; and
   a control device which allows the screen to display warning contents to the effect that the seatbelt should be fastened, when an ignition switch is turned on and the seatbelt is detected as being unfastened by the seatbelt fastening detection device,
   wherein the warning contents are changed to raise a warning level thereof step by step in accordance with the vehicle speed.

2. A seatbelt fastening prompting apparatus according to claim 1,
   wherein the warning contents are displayed continuously for a predetermined time after starting the vehicle, and the warning contents are displayed on the screen intermittently while original driving assistance information is displayed thereon after the predetermined time has elapsed.

3. A seatbelt fastening prompting apparatus according to claim 1,
   wherein the control device allows the screen to display the warning contents when the seatbelt of at least one of a driver's seat and another seat in which a passenger is seated is unfastened.

4. A seatbelt fastening prompting apparatus according to claim 1,
   wherein the display device of driving assistance information is a navigation system.

5. A seatbelt fastening prompting apparatus, comprising:
   display means of driving assistance information for displaying driving assistance information on a screen;
   seatbelt fastening detection means for detecting a fastening situation of a seatbelt as to whether the seatbelt is fastened or unfastened;
   vehicle speed detection means for detecting a vehicle speed; and control means for allowing the screen to display warning contents to the effect that the seatbelt should be fastened when an ignition switch is turned on and the seatbelt is detected as being unfastened by the seatbelt fastening detection means, wherein the warning contents are changed to raise a warning level thereof step by step in accordance with the vehicle speed.

* * * * *